J. VAUDREUIL.
CASING FOR DISH WASHING MACHINES.
APPLICATION FILED JULY 7, 1919.

1,345,519.

Patented July 6, 1920.

Witness:
T. F. Britt

Inventor:
John Vaudreuil
By Young & Young
Attorneys

UNITED STATES PATENT OFFICE.

JOHN VAUDREUIL, OF MILWAUKEE, WISCONSIN.

CASING FOR DISH-WASHING MACHINES.

1,345,519.   Specification of Letters Patent.   Patented July 6, 1920.

Application filed July 7, 1919. Serial No. 309,118.

*To all whom it may concern:*

Be it known that I, JOHN VAUDREUIL, a citizen of the United States, and resident of Milwaukee, in the county of Milwaukee and State of Wisconsin, have invented certain new and useful Improvements in Casings for Dish-Washing Machines; and I do hereby declare that the following is a full, clear, and exact description thereof.

My invention relates to new and useful improvements in dish-washing machines of that type wherein spray jets of considerable velocity are utilized to effect the washing operation by discharge against dishes contained in the machine.

Such machines usually include casings having removable covers to permit insertion and removal of dish carrying baskets or trays in the machine.

A considerable disadvantage has heretofore been encountered in the liability of leakage between the cover and casing incidental to the necessary force of the spray action in the casing to effect efficient cleansing, the utilization of rubber or other packing material having been heretofore relied upon to effect a seal preventing leakage between the cover and casing body.

It is primarily the object of my invention to provide a casing wherein leakage incidental to the spray action is positively prevented and wherein a most economical structure is procured, obviating the necessity of rubber or other packing material between the body of the casing and the removable portion thereof.

A further object which is accomplished incidental to the accomplishment of said primary object is to provide for a most ready insertion and removal of a basket or tray from the machine.

A still further and important object of my invention resides in the provision of an arrangement for insuring positive deflection back into the basket or tray of sprays or jets which may arise therefrom, whereby to procure a maximum cleansing action.

With the above and other objects and advantages in view, which will be apparent as the description proceeds, my invention resides in the novel features of construction, combination and arrangement of parts as hereinafter described and defined by the appended claims.

Figure 1:
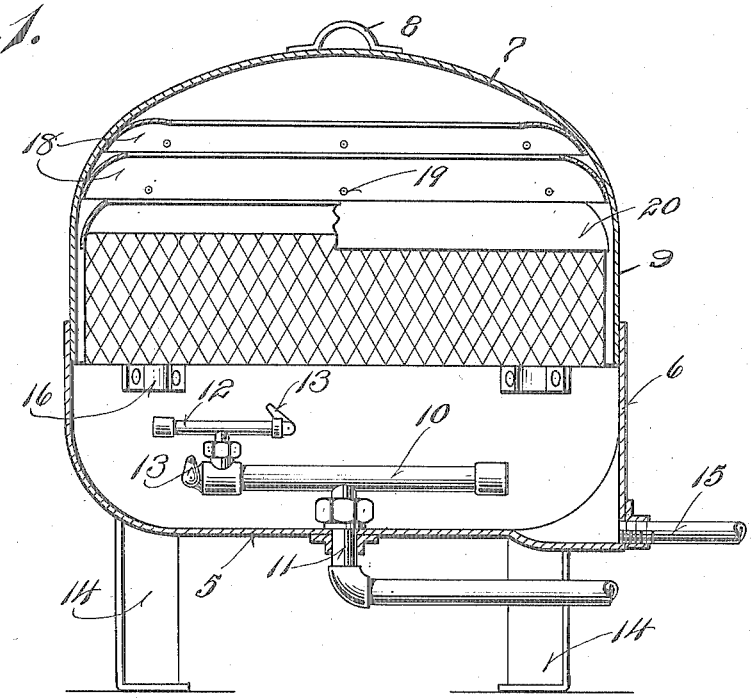
Figure 1 is a vertical sectional view through a washing machine having its casing constructed in accordance with my invention.
Figure 2:
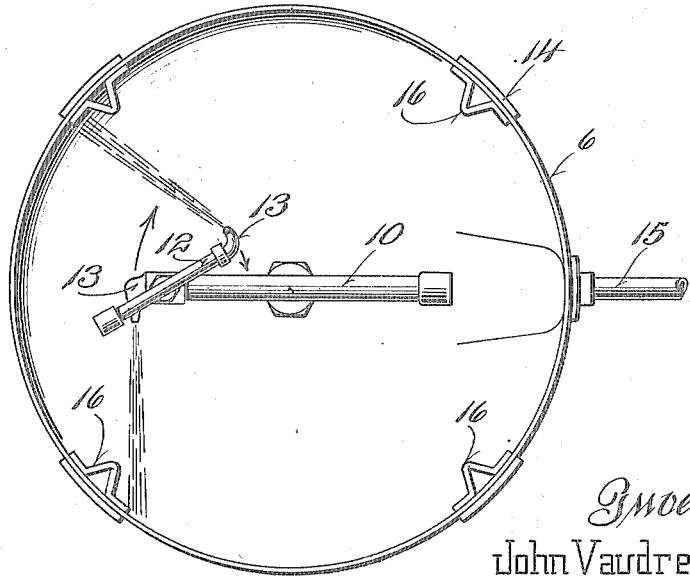
Fig. 2 is a plan view of the lower portion of the casing.

Referring now more particularly to the accompanying drawings, I provide a casing formed in two separable parts; a lower or base portion including the bottom 5 and walls 6, and an upper or cover portion comprising the dome-shaped top 7 carrying a handle 8 and which merges into walls 9 which are of slightly lesser dimensions than the walls 6 of the lower section whereby to fit snugly therein, the height of the upper section walls being, in the present instance, approximately equal to the height of the walls 6 whereby the upper section including said walls forms a material portion of the casing in addition to providing a cover therefor, in contradistinction to other structures such as shown in my co-pending application for patent filed March 18, 1918, Serial No. 223,102, wherein the walls of the base or body carrying portion extend practically to the top of the complete casing. Disposed in the lower casing portion is a suitable fluid discharge means preferably of the type embodied in my co-pending application and including a revolving pipe 10 having a central depending nipple journaled in a supply pipe 11 extending through the bottom 5, a distributing pipe 12 being swiveled on one end of the pipe 10 and communicating therewith, both pipes being revolved by lateral discharge nozzles 13, which are inclined upwardly whereby water discharged therefrom will be directed against the dishes at constantly varying angles to effect a most efficient cleansing operation. The lower casing section is supported on suitable legs 14 and is provided with a suitable drain 15.

The walls 9 of the upper casing section are supported within the walls of the lower section by bracket strips 16 which extend inwardly from the wall of the lower casing section at its upper portion. These bracket strips also form the support for the dish carrying basket 17 of the washing machine.

It is thus noted that the basket is housed entirely within the upper casing section, and consequently the joint between the upper or cover portion of the section and the lower or base body portion of the section is disposed below the normal zone of spray created incidentally to the discharge of fluid from the jets 13 against dishes and the like contained in the basket 17. Hence there is set up no tendency for cleansing fluid to pass through the joint, and fluid striking the walls 9 of the upper casing section will simply drain into the lower section, and leakage of fluid from the casing is thus positively prevented without the necessity of resorting to any packing material between the casing sections, which packing material, in addition to constituting an added item of manufacturing expense is also liable to wear which would permit leakage. Also, by the provision of an upper casing section including the upper wall portions 9 of the main casing, removal of said section will expose the major portion of the basket whereby it may be most readily removed in contradistinction to other types of casings wherein the basket is set down within the fixed walls of the casing and must be lifted to an inconvenient height for removal, in addition to the disadvantage encountered in grasping the basket, particularly when the basket is hot and the casing filled with steam incidental to the washing operation.

To procure a maximum efficiency of the spray action, a series of annular baffle plates 18 are secured within the upper section of the casing, the lower edge portions of these plates being engaged with the casing, and said plates being inclined inwardly from their engaging portions whereby to provide oblique baffle surfaces adapted to engage the jets and sprays which pass through or arise from the basket whereby to deflect said jets or sprays back into the basket to procure a further cleansing action on articles carried therein. The lower portions of said plates are provided with suitable apertures 19 for drainage and a similar deflecting plate 20 is preferably carried by the upper portion of the basket. It is incidentally noted that one of the annular deflecting surfaces may be in certain instances utilized to shield the connection of the cover or upper section of the casing when said connection is disposed above the top of the basket.

I claim:

1. A dish-washing machine including a lower casing section, brackets on the inner faces of the upper portions of the walls of the lower casing section, an upper casing section having its walls adapted to fit within the upper portions of the walls of the lower section and seat on said brackets, an article supporting member removably seated on said brackets, and means for discharging fluid jets in the casing against articles carried in said member.

2. A dish-washing machine including a casing, an article carrying member removably mounted in the lower portion of the casing, fluid jet discharge means mounted in the lower portion of the casing and arranged to discharge fluid upwardly, and a series of superposed deflecting surfaces extending obliquely inward in the upper portion of the casing and disposed in acute angular relation to the immediately adjacent casing portions for deflecting jets of liquid downwardly against articles carried in said article carrying member.

In testimony that I claim the foregoing I have hereunto set my hand at Milwaukee, in the county of Milwaukee and State of Wisconsin.

JOHN VAUDREUIL.